(12) United States Patent
Suzuki

(10) Patent No.: US 6,426,773 B1
(45) Date of Patent: *Jul. 30, 2002

(54) IMAGE PICKUP DEVICE INCLUDING AN IMAGE PICKUP UNIT WHICH IS DISPLACED RELATIVE TO AN OBJECT TO BE IMAGED

(75) Inventor: Akira Suzuki, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,899

(22) Filed: Mar. 27, 1998

(30) Foreign Application Priority Data

Mar. 31, 1997 (JP) ............................... 9-098429
Mar. 4, 1998 (JP) ............................. 10-052523

(51) Int. Cl.[7] .......................... H04N 3/14; H04N 5/335; H04N 5/225
(52) U.S. Cl. ........................ 348/272; 348/373; 348/219
(58) Field of Search .................................. 348/219, 242, 348/253, 263, 272, 344; 382/162, 167

(56) References Cited

U.S. PATENT DOCUMENTS

| | | | |
|---|---|---|---|
| 3,975,760 A | | 8/1976 | Yamanaka et al. |
| 4,404,594 A | * | 9/1983 | Hannan ...................... 348/344 |
| 4,535,363 A | * | 8/1985 | Harada et al. ............... 348/219 |
| 4,541,116 A | * | 9/1985 | Lougheed ................... 382/303 |
| 4,642,678 A | * | 2/1987 | Cok ........................... 348/242 |
| 4,786,964 A | * | 11/1988 | Plummer et al. ........... 348/270 |
| 4,998,164 A | * | 3/1991 | Endo et al. ................. 348/219 |
| 5,245,416 A | * | 9/1993 | Glenn ......................... 348/219 |
| 5,347,599 A | * | 9/1994 | Yamashita et al. ............ 382/54 |
| 5,475,769 A | * | 12/1995 | Wober et al. ............... 348/242 |
| 5,834,761 A | * | 11/1998 | Okada et al. ............ 250/208.1 |
| 5,877,805 A | * | 3/1999 | Endo ........................... 348/218 |
| 6,031,569 A | * | 2/2000 | Nobuoka et al. ........... 348/220 |

FOREIGN PATENT DOCUMENTS

DE 38 37 063 3/1990
JP 7-322121 12/1995

* cited by examiner

Primary Examiner—Andrew B. Christensen
(74) Attorney, Agent, or Firm—Oblon, Spivak, McClelland, Maier & Neustadt, P.C.

(57) ABSTRACT

In configuration for optically inputting an image of an object to be picked up by a lens and obtaining color image information from the image of the picked-up object inputted through the lens by a CCD on which light-sensing elements having sensitivity for a different wavelength are two-dimensionally arrayed, a CPU relatively displaces the CCD and the image of the picked-up object by driving an actuator connected to the CCD, obtains a plurality sheets of color image information for the same picked-up object from the CCD and also obtains color image information for a certain color for one screen according to the plurality sheets of color image information, and further obtains color image information for one screen using the color image information for the certain color for one screen.

8 Claims, 23 Drawing Sheets

| R | G | R | G | R | G |
|---|---|---|---|---|---|
| G | B | G | B | G | B |
| R | G | R | G | R | G |
| G | B | G | B | G | B |

FIG.4

| R | G | R | G | R |
|---|---|---|---|---|
| G | B | G | B | G |
| R | G | R | G | R |

FIG.5

| R | G | R | G | R |
|---|---|---|---|---|
| G | B | G | B | G |
| R | G | R | G | R |

→ X

| R | G | R | G | R |
| G | R | G | R | G |
| G | B | G | B | G |
| B | G | B | G | B |
| R | G | R | G | R |
| G | R | G | R | G |

FIG.10
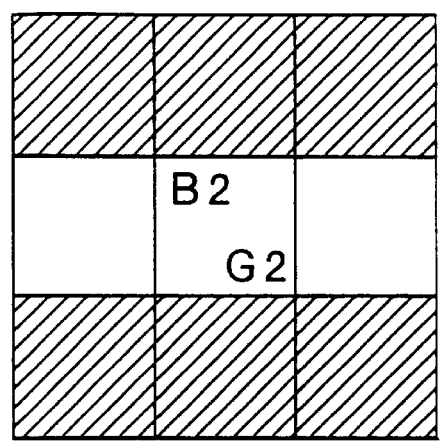
FIG.11
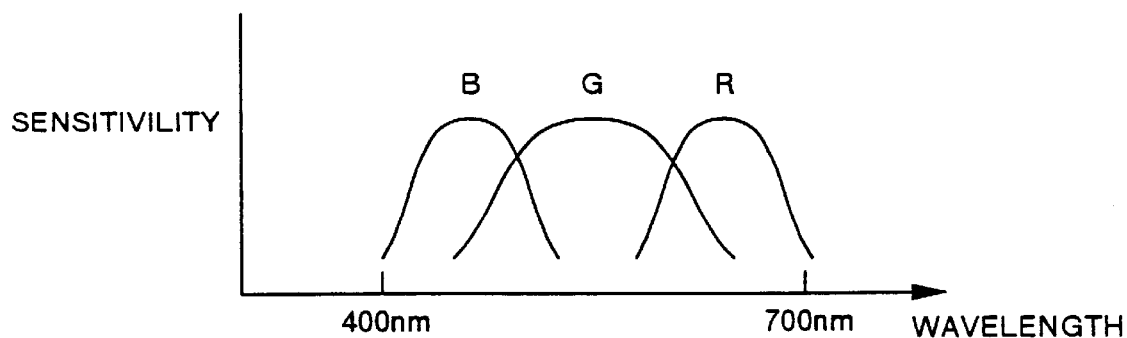
FIG.12
| G | R | G | B | G |
|---|---|---|---|---|
| G | R | G | B | G |
| G | R | G | B | G |
| G | R | G | B | G |

FIG.13

| R1  | G2  | R3  |
|  G1 |  R2 |  G3 |
| G4  | B5  | G6  |
|  B4 |  G5 |  B6 — REMARKED PIXEL |
| R7  | G8  | R9  |
|  G7 |  R8 |  G9 |

FIG.14

LIGHT — DARK

| R1  | G2  | R3  |
|  G1 |  R2 |  G3 |
| G4  | B5  | G6  |
|  B4 |  G5 |  B6 — REMARKED PIXEL |
| R7  | G8  | R9  |
|  G7 |  R8 |  G9 |

FIG.15

|     | m-1 | m | m+1 |
|-----|-----|---|-----|
| n-1 | C  G | G  C | C  G |
| n   | G  C | C  G | G  C |
| n+1 | C  G | G  C | C  G |

FIG.24

| G | G | G | G |
|---|---|---|---|
| R | B | R | B |
| G | G | G | G |
| R | B | R | B |

FIG.25

| G · · B | G · · R | G · · R | G · · B |
|---|---|---|---|
| R · · G | B · · G | R · · G | B · · G |
| G · · B | G · · R | G · · B | G · · R |

IMAGE PICKUP DEVICE INCLUDING AN IMAGE PICKUP UNIT WHICH IS DISPLACED RELATIVE TO AN OBJECT TO BE IMAGED

FIELD OF THE INVENTION

The present invention relates to an image pickup device and more particularly, to an image pickup device for inputting high-quality color image information for an object to be picked up by using image pickup elements.

BACKGROUND OF THE INVENTION

In order to obtain color image information, image pickup elements each having sensitivity for a different wavelength such as R, G, and B (Elementary colors) or Y, M, C, and G (Complementary colors) are generally required. For this reason, there have been three types of image pickup systems based on the conventional technology.

Namely, a first image pickup system is based on a technique for obtaining color image information for each color of R, G, and B by incorporating color filters in an optical system for picking up and sequentially switching the color filters. FIG. 35 is a view schematically showing an image pickup device employing the first image pickup system. In the first image pickup system, as shown in FIG. 35, a R (Red) filter 402, a G (Green) filter 403, and a B (Blue) filter 404 are provided as color filters in a section between an optical system for picking-up 401 and an image pickup element 405.

The color filters are sequentially switched to each other by moving the R (Red) filter 402, G (Green) filter 403, and B (Blue) filter 404 in a direction indicated by the arrow S (in the vertical direction in the figure) In the first image pickup system, it takes a long time to obtain color image information due to effects by this switching operation.

A second image pickup system is based on a technique for separating an image of a picked-up object into three colors with a dichroic prism or the like and obtaining color image information for each color from images of the picked-up object each obtained by having been subjected to color separation into R, G, and B respectively with three sheets of image pickup elements, and this technique is generally referred to as a 3CCD system. FIG. 36 is a view schematically showing an image pickup device employing the second image pickup system. In the second image pickup system, as shown in FIG. 36, a dichroic prism 505 is provided in a section surrounded by an optical system for picking-up 501 and a R-image pickup element 502, a G-image pickup element 503, and a B-image pickup element 504.

Although there is a merit of enabling concurrent acquisition of color image information for colors (R, G, and B) in the second image pickup system as compared to that in the first image pickup system, a complicated prism has to be used or three sheets of R, G and B image pickup elements 502, 503 and 504 are required, which causes a price of the device to be extremely high.

A third image pickup system is based on a technique for obtaining color information with sensitivity for a different wavelength for each pixel received by a solid-state image pickup element system. FIG. 37 is a view schematically showing an image pickup device employing the third image pickup system, FIG. 38 is a view showing a color array on a light-sensing element, FIG. 39 is a view showing an example of a picked-up object having light and dark, and FIG. 40 is a view showing a density level corresponding to each color. In the third system, a solid-state color image pickup element 602 has color filters provided on light-sensing elements two-dimensionally arrayed as shown in FIG. 38, and the light-sensing elements are arrayed so that each of the elements has sensitivity for a different wavelength for each pixel.

In this third image pickup system, as shown in FIG. 37, color information can be obtained with sensitivity for a different wavelength for each pixel received by the solid-state color image pickup element 602 through an optical system for picking-up 601. Although there is a merit of enabling acquisition of color image information with a single plate in the third image pickup system, it is not possible to obtain color information for the same section of the same object to be picked up because the light-sensing elements each having sensitivity for a different wavelength are arrayed on one plane.

For this reason, as shown in FIG. 39, when color image information for a certain image of picked-up object having light and dark sections in each pixel is obtained by a solid-state color image pickup element with the color array as shown in FIG. 38, signals corresponding to the colors R, G and B are generated as shown in FIG. 40. The phenomenon described above is generally referred to as a pseudo color. To prevent this type of phenomenon, it is necessary not to receive an image having light and dark sections shown in FIG. 39, namely a high frequency image. Namely, in general, the image is shaded off by providing an optical low-pass filter in the picking-up optical system 601, so that generation of the pseudo color can be prevented by making use of the shading-off.

When the image has been shaded off by the optical low-pass filter, however, a high-resolution image can not be obtained. There has been proposed, as a method of solving this problem, for example, "Image pickup device for high-quality images" disclosed in Japanese Patent Laid-Open Publication No. HEI 7-322121.

Disclosed in this Publication is a technology in which a position of an image of a picked-up object is displaced to image pickup elements by using a VA (Variable Angle) prism as an optical axis changing device so that a high-quality image is obtained through this displacement. With this technology, assuming a total number of pixels of the image pickup elements is m-pixels obtained by fetching the same image a plurality of times, if images of n-types of different picked-up objects are fetched, images equivalent to n×m-pixels are obtained.

The technology according to this Publication is a combined system obtained by combining the second image pickup system with the third image pickup system. FIG. 41 and FIG. 42 are views each for explaining this combined system with a color array. In this combined system, color information of C, Y, M and G each for the same section of an object to be picked up is obtained by displacing an image pickup element having the color array (Refer to FIG. 41) of filters for complementary colors of C (Cyan), Y (Yellow), M (Magenta), and G (Green) by one pixel pitch in four directions horizontally and vertically to obtain four sheets of color image information as shown in FIG. 42.

In the image pickup device for high-quality images based on the conventional technology like that disclosed in the Publication, the second image pickup system is performed in time sequence by displacing an image of an object to be picked up, so that four-color image information is sequentially obtained because changing is executed like in the first image pickup system although a pseudo color like in the third image pickup system does not occur. For this reason, although the occurrence of a pseudo color is prevented by the second system, there occur such problems as that an unnecessarily long time is spent for image pickup, that hands are unintentionally moved in taking a picture, or that a two axial displacing device (horizontal direction and vertical direction) is required for displacing an image pickup element in the hour directions horizontally and vertically.

SUMMARY OF THE INVENTION

It is an object of the present invention to provide an image pickup device in which occurrence of a pseudo color and unintentional movement of hands in taking a picture can be prevented with a simple configuration.

An image pickup device according to the present invention comprises, an optical input unit for optically inputting an image of an object to be picked up; an image pickup unit, in which light-sensing elements each having sensitivity for a different wavelength are two-dimensionally arrayed, for obtaining color image information from the image of the picked-up object inputted from the optical input unit; a relative position displacing unit connected to the image pickup unit for relatively displacing the image pickup unit and the image of the picked-up object inputted from the optical input unit; and a control unit for driving the relative position displacing unit to obtain a plurality sheets of color image information for the same picked-up object from the image pickup unit and also to obtain color image information for a certain color for one screen according to the plurality sheets of color image information, and further to obtain color image information for one screen using the color image information for the certain color for one screen.

With the image pickup device according to the present invention, the image pickup unit and the image of the picked-up object inputted by the optical input unit are relatively displaced from each other by the relative position displacing unit, and color image information for a certain color for one screen is obtained according to a plurality sheets of color image information for the same picked-up object obtained by the displacement, and further color image information for one screen is obtained according to the color image information for the certain color for one screen, so that, by making use of the fact that the sensitivity for detecting change in color phase is lower than that for detecting change in brightness which is human visual characteristics and a change in hue at a high frequency is not sensed as it is but is sensed as gray, occurrence of a pseudo color or unintentional movement of hands in taking a picture can be prevented with simple configuration.

In an image pickup device according to the present invention, the control unit obtains short color image information for a remarked pixel according to correlation in the certain color.

With the image pickup device according to the present invention, short color image information for a remarked pixel is obtained according to correlation in the certain color, so that short color image information can accurately be computed.

In an image pickup device according to the present invention, the control unit compares color image information for a certain color for the remarked pixel to the color image information for the certain color for other pixels around the remarked pixel, and obtains short color image information for the remarked pixel according to color image information for a pixel around the remarked pixel having the highest correlation.

With the image pickup device according to the present invention, color image information for a certain color for the remarked pixel and the color image information for the certain color for other pixels around the remarked pixel are compared to each other, and short color image information for the remarked pixel is obtained according to color image information for a pixel around the remarked pixel having the highest correlation, so that short color image information can accurately be computed.

In an image pickup device according to the present invention, the light-sensing elements are provided so that, when preparing short color image information for a remarked pixel, at least one available pixel exists around the remarked pixel in each of the horizontal, vertical, and diagonal directions against the remarked pixel.

With the image pickup device according to the present invention, the light-sensing elements are provided so that, when preparing short color image information for a remarked pixel, at least one available pixel exists around the remarked pixel in each of the horizontal, vertical, and diagonal directions against the remarked pixel, so that short color image information can accurately be computed.

In an image pickup device according to the present invention, the control unit compares color image information with a certain color for the remarked pixels to the color image information for a certain color for the available pixels around the remarked pixel, and obtains short color image information for the remarked pixel according to color image information for one of the available pixels around the remarked pixel with the highest correlation.

With the image pickup device according to the present invention, color image information with a certain color for the remarked pixels is compared to the color image information for a certain color for the available pixels around the remarked pixel, and short color image information for the remarked pixel is obtained according to color image information for one of the available pixels around the remarked pixel with the highest correlation, so that short color image information can more accurately be computed.

In an image pickup device according to the present invention, the relative position displacing unit displaces either one of the object to be picked up and the image pickup unit.

With the image pickup device according to the present invention, either one of the object to be picked up and the image pickup unit is displaced, so that displacement occurs in a relative position, and with this feature, it is possible to obtain simple configuration not requiring a plurality of image pickup elements nor a mirror optical system.

In an image pickup device according to the present invention, the image pickup unit comprises a plurality of image pickup elements, and the relative position displacing unit branches an image of an object to be picked up inputted by the optical input unit to a plurality of light paths to have the same image of the object to be picked up as the image of the object to be picked up received by each of the image pickup elements.

With the image pickup device according to the present invention, an image of an object to be picked up inputted by the optical input unit is branched to a plurality of light paths to have the same image of the object to be picked up as the image of the object to be picked up received by each of the image pickup elements, so that it is possible to acquire information for moving video pictures without occurrence of unintentional movement of hands in taking a picture, and also possible to obtain simple configuration not requiring a complicated optical system such as dichroic prism for color separation like a three-plate type of image pickup device.

In an image pickup device according to the present invention, the image pickup unit has filters for three elementary colors of R (Red), G (Green), and B (Blue), and the filters for three elementary colors are arrayed so that the elementary color filter for G (Green), which is the certain color, can be positioned for all pixel positions when displaced by the relative position displacing unit.

With the image pickup device according to the present invention, the filters for three elementary colors of R, G, and B are arrayed so that the elementary color filter for G (Green), which is the certain color, can be positioned for all pixel positions when displaced by the relative position displacing unit, so that the elementary filter of G has wide spectrum sensitivity overlapping both of spectrum sensitivity of R (Red) as well as of B (Blue), and with this feature, an information amount for an image of an object to be picked up increases by acquiring color image information for G over one entire screen, which enables the color image to be matched to human visual characteristics.

In an image pickup device according to the present invention, the image pickup unit has an electronic shutter and a mechanical shutter, sets an effective accumulation time within the each exposure time for the color image information according to a timing for driving the electronic shutter and the mechanical shutter, and finishes a transfer operation by the image pickup unit within the exposure time.

With the image pickup device according to the present invention, an effective accumulation time within the each exposure time for the color image information is set according to a timing for driving the electronic shutter and the mechanical shutter, and a transfer operation by the image pickup unit is finished within the exposure time, so that each interval between accumulation times to obtain a plurality of color image information can be reduced, and with this feature, it is possible to resolve the problems such as unintentional movement of hands in taking a picture.

In an image pickup device according to the present invention, the control unit corrects at least a difference in accumulation times for the plurality of color image information.

With the image pickup device according to the present invention, at least a difference in accumulation times for the plurality of color image information is corrected, so that it is possible to acquire a high-quality image even if there is nonuniformity in exposure when a plurality of color image information is acquired.

Other objects and features of this invention will become understood from the following description with reference to the accompanying drawings.

BRIEF DESCRIPTION OF THE DRAWINGS

FIG. 4 is a view for explaining how the light-sensing elements are changing along each relative displacement is according to Embodiment 1;

FIG. 5 is a view for explaining how the light-sensing elements are changing along each relative displacement according to Embodiment 1;

FIG. 10 is a view for explaining repeat patterns between light sections and dark sections in Embodiment 1;

FIG. 11 is a view graphically showing a relation between wavelengths and sensitivity in one modification;

FIG. 12 is a view showing one example of an array in a stripe form in another modification;

FIG. 13 is a view for explaining color image information for a remarked pixel according to Embodiment 2;

FIG. 14 is a view for explaining a pattern between light sections and dark sections in Embodiment 2;

FIG. 15 is a view showing generalized color image information for a remarked pixel in Embodiment 2;

FIG. 24 is a view showing other color array of light-sensing elements in Embodiment 3;

FIG. 25 is a view for explaining how the light-sensing elements shown in FIG. 24 change according to relative displacement in Embodiment 3;

DESCRIPTION OF THE PREFERRED EMBODIMENT

Detailed description is made hereinafter for preferred embodiments of the image pickup device according to the present invention with reference to the related drawings. It should be noted that the description assumes a case of a digital camera as one embodiment of the present invention in the embodiments described below.

Figure 1:
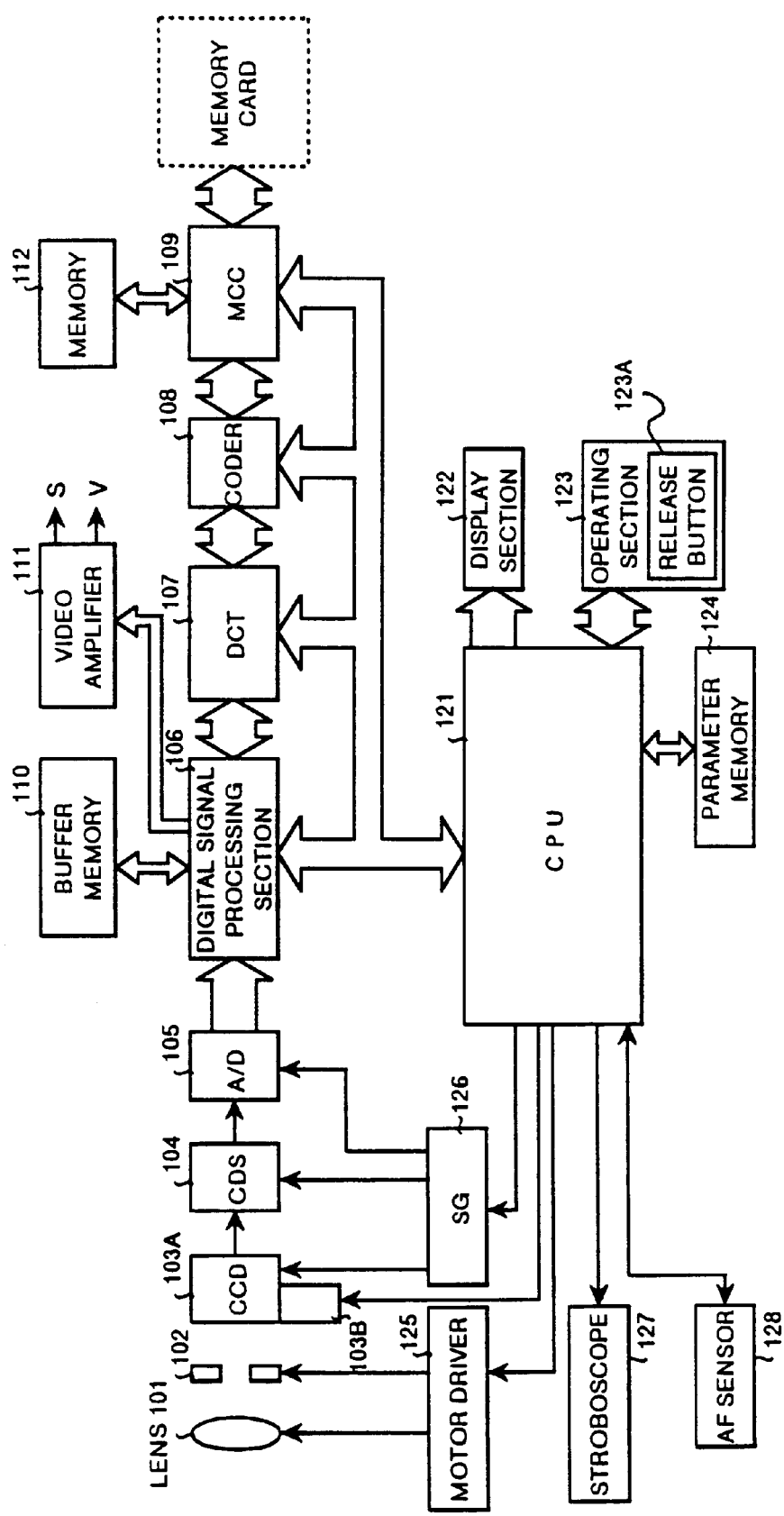
FIG. 1 is a block diagram showing configuration of a digital camera according to Embodiment 1 of the present invention.

FIG. 1 is. a block diagram showing configuration of a digital camera according to Embodiment 1 of the present invention. The digital camera comprises, as shown in FIG. 1, a lens 101, a mechanical section 102 including an autofocus or the like, a CCD 103A, an actuator 103B, a CDS (correlation-duplexed sampling) circuit 104, an A/D converter 105, a digital signal processing section 106, a DCT 107, a coder 108, a MCC 109, a buffer memory 110, a video amplifier 111, an internal memory 112, a CPU 121, a display section 122, an operating section 123, a parameter memory 124, a motor driver 125, a SG (control signal generating) section 126, a stroboscope 127, and an AF sensor 128.

A lens unit comprises the lens 101 and the mechanical section 102 including autofocus (AF)/diaphragm/filter section, and a mechanical shutter of the mechanical section 102 concurrently exposes two fields. The CCD 103A converts a video image received through the lens unit to an electric signal (analog image data). The actuator 103B attached to the CCD 103A displaces a relatively positional relation between the CCD 103A and an object to be picked up according to controls by the CPU 121.

The CDS circuit 104 is used for reducing noises to the CCD type of image pickup element. The A/D converter 105 converts analog image data received by the CCD 103A through the CDS circuit to digital image data. Namely, an output signal from the CCD 103A is converted to a digital signal by the A/D converter 105 through the CDS circuit 104 at an optimal sampling frequency (for instance, integral multiple of a subcarrier frequency of an NTSC signal).

The digital signal processing section 106 separates digital image data received from the A/D converter 105 into hue and brightness for being subjected to various processing and data processing for correction and image compression/expansion. DCT (Discrete Cosine Transform) 107 executes orthogonal conversion which is one process of image compression/expansion that follows JPEG, and the coder (Huffman Encoder/decoder) 108 executes processing such as Huffman encoding/hybrid processing which is one process of image compression/expansion that follows JPEG.

The MCC (Memory Card Controller) 109 accumulates once the compressed image and speech fetched from a microphone (not shown) and digitized, and records or reads out the information to and from the internal memory 112 or a memory card through concurrent processing thereto. The CPU 121 provides controls for operations of each section according to an instruction from the operating section 123 or an instruction for external operations by a remote control or the like (not shown in the figure).

The display section 122 is realized with an LCD, an LED or EL or the like, displays an image thereon according to the picked-up digital image data and recorded image data having been subjected to expansion processing, and also displays thereon a status of the digital camera or the like. The operating section 123 has buttons for selection of a function, instruction of picking-up, or some other various settings executed from the outside. This operating section 123 has a release button 123A, and outputs a release signal to the CPU 121 through operation of the release button 123A.

Figures 2, 3:
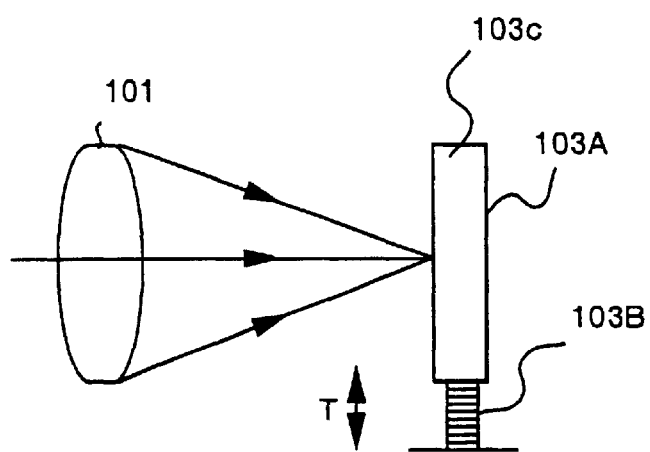
FIG. 2 is a view showing a relative displacing mechanism according to Embodiment 1.
FIG. 3 is a view for explaining how the light-sensing elements are changing along each relative displacement according to Embodiment 1.

Next description is made for a key section of the image pickup device. FIG. 2 is a view showing a relative displacing mechanism according to Embodiment 1. In FIG. 2, the CCD 103A as a solid-state color image pickup element is attached to an element holder 103C and supported. The actuator 103B as a relative position displacing unit is connected to this element holder 103C, and moves this element holder 103C in the direction indicated by the arrow T. It should be noted that an angle of attachment of the actuator 103B to the holder is not limited to the angle shown in the figure, and any angle corresponding to the direction to which the CCD 103A is displaced may be employed for attachment. For example, when the CCD 103A is displaced in the diagonal direction, the actuator 103B may be attached to the element holder 103C in the diagonal direction.

According to the configuration shown in FIG. 2, an image of a picked-up object incoming through the lens 101 as an image pickup optical system is obtained by being received by the CCD 103A, but a picking-up range is changed by driving the actuator 103B under the controls by the CPU 121, a plurality sheets of image of the picked-up object (color image information) can be acquired in a plurality of different relative positions between the CCD 103A and the object to be picked up.

Figure 8:
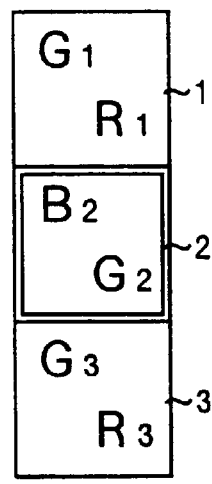
FIG. 8 is a view for explaining color image information for a remarked pixel in Embodiment 1.
Figure 9:
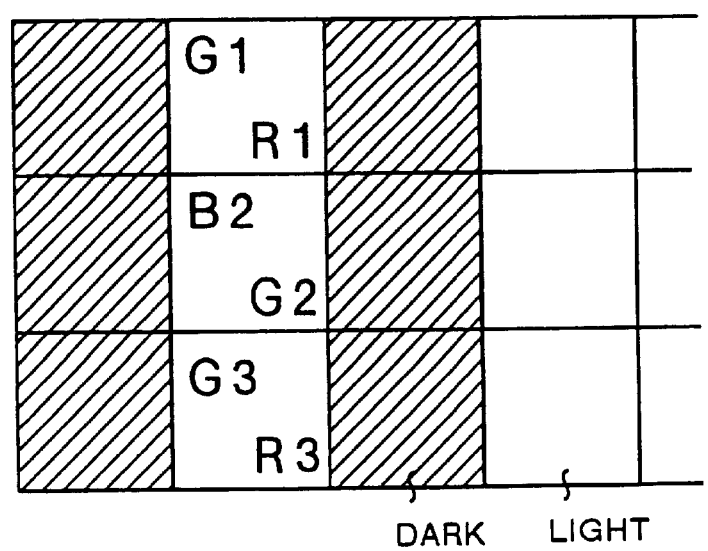
FIG. 9 is a view for explaining repeat patterns between light sections and dark sections in Embodiment 1.

Next description is made for a method of acquiring color image information according to Embodiment 1. FIG. 3 to FIG. 7 are views for explaining how the light-sensing elements are moved through each relative displacement according to Embodiment 1, FIG. 8 is a view for explaining color image information for a remarked pixel, and FIG. 9 and FIG. 10 are views for explaining repeat patterns between light sections and dark sections.

The CCD 103A in FIG. 3 shows a color array for arraying pixels in a matrix in the order of R (Red), G (Green) and B (Blue). An R pixel, a B pixel and a G pixel hit light-sensing sections each having sensitivity mainly to each of red, blue and green respectively. However, the array comprising pixels of R, G and B shows an ordinary R, G and B-checkered pattern, and for this reason the array is not limited to the array described above.

Figures 4, 5:
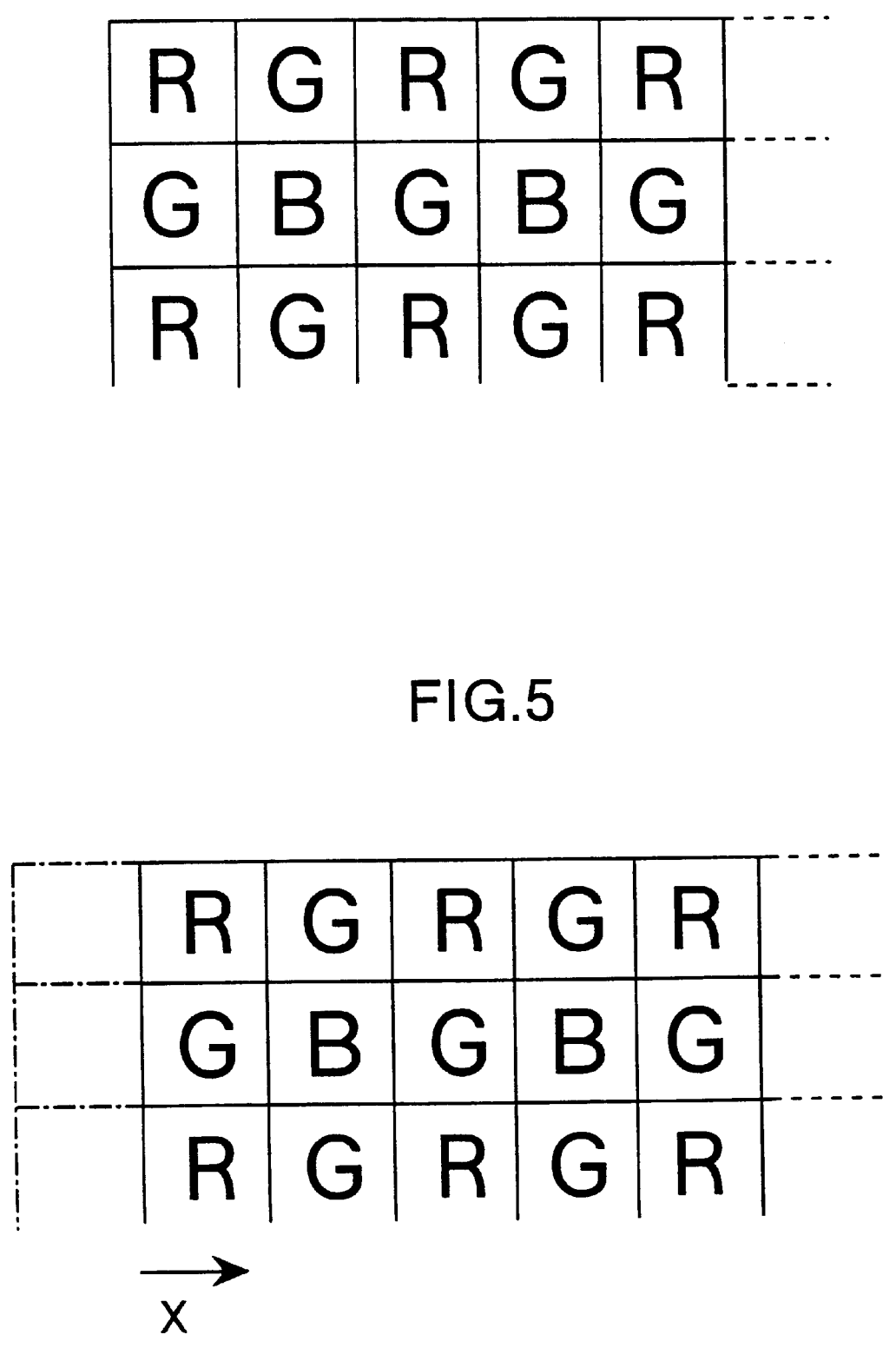

Assuming that a pattern in FIG. 4 shows color image information for an image of a picked-up object as the reference, if the CCD 103A as a solid-state image pickup element is relatively displaced by one pixel to the image of the picked-up object in the horizontal direction (direction indicated by the arrow X in FIG. 5) by the actuator 103B as a relative position displacing unit, the color image information displaced to the right by one pixel from the reference one shown in FIG. 4 is obtained as shown in FIG. 5.

Figures 6, 7:
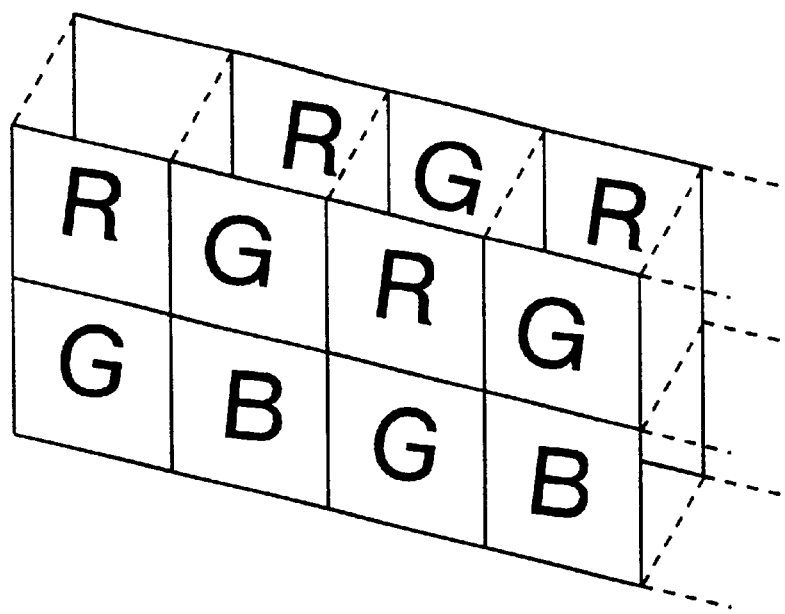
FIG. 6 is a view for explaining how the light-sensing elements are changing along each relative displacement according to Embodiment 1.
FIG. 7 is a view for explaining how the light-sensing elements are changing along each relative displacement according to Embodiment 1.
Figures 41, 42:
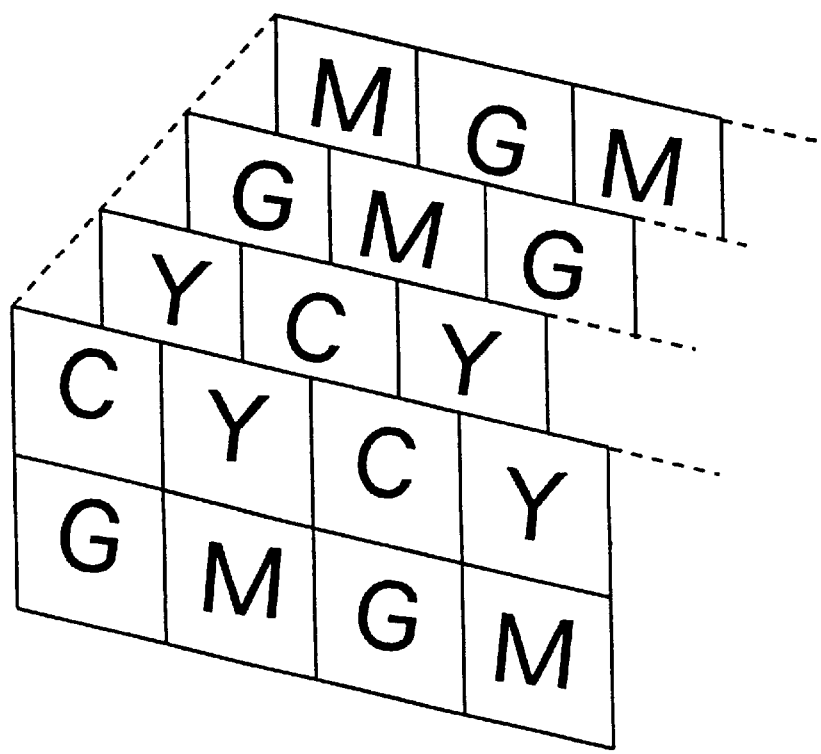
FIG. 41 is a view for explaining a combination system with a color array based on the conventional technology.
FIG. 42 is a view for explaining a combination system with a color array based on the conventional technology.

Then, the reference color image information and the color image information obtained by being displaced are superimposed on each other as in FIG. 42 and a correlation between both of the information for the same image of the picked-up object is studied. Namely, as shown in FIG. 6, in the same image of the picked-up object, the reference color image information is an image of the picked-up object with the left edge thereof sensed by the first array (R, G, B . . . ) of the CCD 103A, but the color image information obtained through the displacement is an image of the picked-up object with the left edge having been displaced to the right by one pixel from the left edge of the reference screen sensed by the first array (R, G, B . . . ) of the CCD 103A because the left edge has been displaced to the right by one pixel from the left edge of the reference screen at the time of picking up the object.

For this reason, a position of an object picked up with, for example, the G pixel at a position in a first column of a second row of the reference CCD 103A results in a position obtained by picking up the object, when picking-up is performed based on the displacement, with the R pixel at a position in a first column of a first row of the CCD 103A. Accordingly, two pixels are arrayed, as shown in FIG. 6, in the same section of the same object to be picked up obtained by picking-up twice based on displacement. Namely, by obtaining two color image information using the actuator 103B, two types of color image information such as a combination of R and G or a combination of B and G can be acquired. With this feature, by referring to the color image information for the G pixel, it is found that color image information for G (Green) exists in all pixel positions as shown in FIG. 7.

Further, a particular section on the image of the picked-up object is described below. FIG. 8 shows color image information for three rows in one column. A pixel position 1 in a first row is a combination of G1 and R1, a pixel position 2 in a second row is a combination of B2 and G2, and a pixel position 3 in a third row is a combination of G3 and R3. Assuming that the pixel position 2 is a remarked section at that time, color image information for the pixel position 2 is a combination of B2 and G2 which indicates that color image information for R (Red) is short. For this reason, as far as the remarked section is concerned, by obtaining color image information R2 for R (Red), color image information for three colors of R2, G2 and B2 can be obtained.

Then, if each color image information for (R, G, B) is expressed by color information (r, g, b) normalized according to brightness information and color-difference information, the expression is obtained as follows: (R, G, B)=I (r, g, b). It is known as one of human visual characteristics that the sensitivity for detecting change in hue of an object to be picked up is generally lower as compared to that for detecting change in brightness thereof. For this reason, in transfer of color image for a television or the like, a band of color-difference signals is smaller as compared to that of a brightness signal such that a proportion of frequency bands to the brightness signal Y as well as to the color-difference signals U, V is as follows: Y:U:V:=4:2:2. The same method is also employed in the image compression technology.

When an expression (R, G, B)=I (r/g, 1, b/g) is obtained by deforming the expression (R, G, B)=I (r, g, b), color image information for a section indicating a color tone such as r/g and b/g does not require to be accurate because of the human visual characteristics. For this reason, an estimate can be effected with color image information for adjacent sections. Namely, referring to the remarked section (short R2 is indicated by R), an expression for the section is obtained as follows: R2=G2·(r2/g2) from R2=I2·g2·(r2/g2) to obtain I2·g2=G2 according to (R2, G2, B2)=I2·g2·(r2/g2, 1, b2/g2).

Assuming herein that the following expression is set by making use of the characteristics: r2/g2 =(r1/g1+r3/g3)/2, the expression R2=G2·(R1/G1+R3/G3)/2 is obtained according to r1/g1=R1/G1 and r3/g3=R3/G3. Image information for all the three elementary colors of the remarked section is obtained which is as follows: (R, G, B)=(G2·(R1/G1+R3/G3)/2, G2, B2).

The same method is applied to a section of the pixel position 3 in FIG. 8 with short color image information for B (Blue), and the following expression for the section can be obtained: (R, G, B)=(R3, G3, G3·(B2/G2+B4/G4)/2). Although the short color image information is estimated by the vertical sections in this example, when color image information like that in FIG. 7 can be obtained, estimates are possible, because r/g and b/g are arrayed for each pitch in the horizontal direction and are arrayed for two pixels in the vertical direction, as far as changes till Nyquist's frequency of a pixel pitch in the horizontal direction and till 1/2 of the Nyquist's frequency in the vertical direction according to the sampling theorem. For this reason, the proportion of Y:U:V:=4:2:2 is quite possibly estimated.

Then, consideration is made on a case where repeated patterns of light sections and dark sections exist in the horizontal direction as shown in FIG. 9. Assuming that the light sections are (R0, G0, B0) and dark sections are (1/10)·(G0, G0, B0), if a pixel of the remarked section is a light section, it is clear that G0 and B0 are reproduced because pixels of G and B exist in color image information for G and B respectively.

Consideration is also made here for R2. When G1=G2=G3=G0, R1=R3=R0 are substituted in the expression R 2=G2·(R1/G1+R3/G3)/2, the expression R2=R0 is obtained, so that a value for R2 can accurately be computed. Similarly, for the dark sections, when G1'=G2'=G3'=(1/10) G0, R1'=R3'=(1/10) R0 are substituted therein, the expression R 2=(1/10) R0 is obtained through accurate computation.

Next description is made for a case where repeated patterns exist in the vertical direction as shown in FIG. 10. It is also clear that B2=B0 and G2=G0 are reproduced.

Consideration is also made here for R2. When R1=R3= (1/10) R0, G1=G3=(1/10) G0 are substituted in the expression R2=G2·(R1/G1+R3/G3)/2, the expression R2=R0 is obtained, which can accurately be produced. Similarly, for the dark sections, the expression R2'=(1/10) R0 can accurately be reproduced. Accordingly, a pseudo color does not occur.

Namely, if r/g and b/g satisfy the conditions described above, a pseudo color does not basically occur. There is a small number of changes in a color tone of an ordinary object to be picked up at such a high frequency, and in case where that sort of change occurs, the tone is reproduced only as gray having no gradation in color, which a man senses only as gray, so that no trouble occurs as far as the color tone is concerned.

As described above, with Embodiment 1, by making use of the fact that the sensitivity for detecting change in hue is lower than that for detecting change in brightness, which is one of the human visual characteristics and a change in hue at a high frequency is not sensed as it is but is sensed as gray, each CCD for R, G, B may not be discretely used as in the three-plate system, and a pseudo color does not occur even if brightness is changed at a high frequency.

Also, either one of the object to be picked up and the image pickup element is displaced, so that displacement occurs in a relative position, and with this feature, it is possible to obtain simple configuration not requiring a plurality of image pickup elements nor a mirror optical system.

In Embodiment 1, the actuator 103B is provided as a relative position displacing unit, and the CCD 103A is displaced in relation to an object to be picked up by this actuator 103B, but, a means such as a generally used laminated piezoelectric element may be applied in this relative position displacing unit.

In Embodiment 1, color image information for G color among filters for elementary colors of R, G, and B is acquired for an entire screen, the same method can be executed for the other R and G colors as well as for an array of complementary colors. However, as shown in FIG. 11, sensitivity for a green (G) is widely distributed in human visual sensitivity as well as in the CCDs 301, 302, so that a better result can be obtained by acquiring color image information for green (G) over the entire screen.

In this case, the filters for three elementary colors of R, G, and B are arrayed so that the elementary color filter for G (Green), which is the certain color, can be positioned for all pixel positions when displaced by the relative position displacing unit, so that the elementary filter of G has wide spectrum sensitivity overlapping both of spectrum sensitivity of R (Red) and B (Blue), and with this feature, an information amount for an image of an object to be picked up increases by acquiring color image information for G over one entire screen, which enable the color image to be matched to human visual characteristics.

Also, in Embodiment 1, although description has been made for the array in the checkered pattern, the present invention is applicable to a stripe-shaped array such as a G column, a R column, G column, a B column, and a G column as shown in FIG. 12.

Although information for adjacent pixels in the vertical direction to the remarked pixel is used when short color information for the remarked pixel is interpolated (computed) in Embodiment 1, description is made in Embodiment 2 for a method of more accurately acquiring short color information by interpolating (computing) the short color information according to adjacent pixels around the remarked pixel. Description is made hereinafter for a method of acquiring color image information according to Embodiment 2 with reference to FIG. 13 to FIG. 16.

Figure 15:
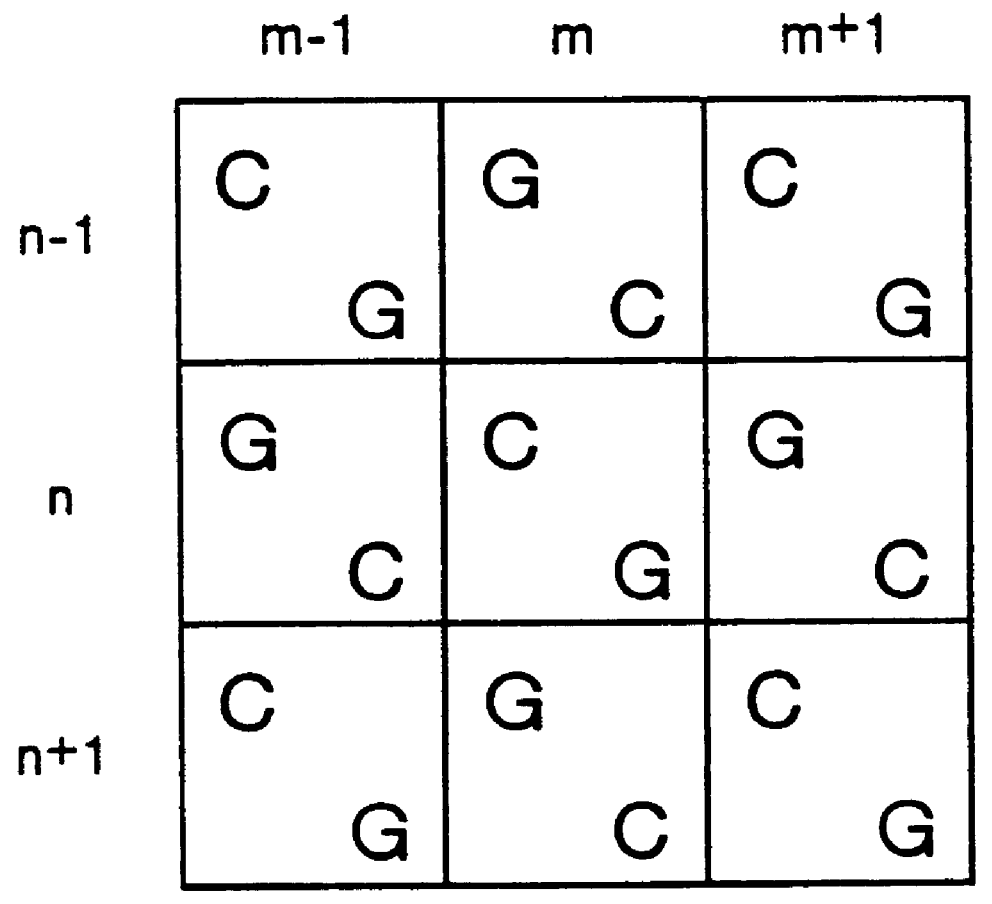
Figure 16:
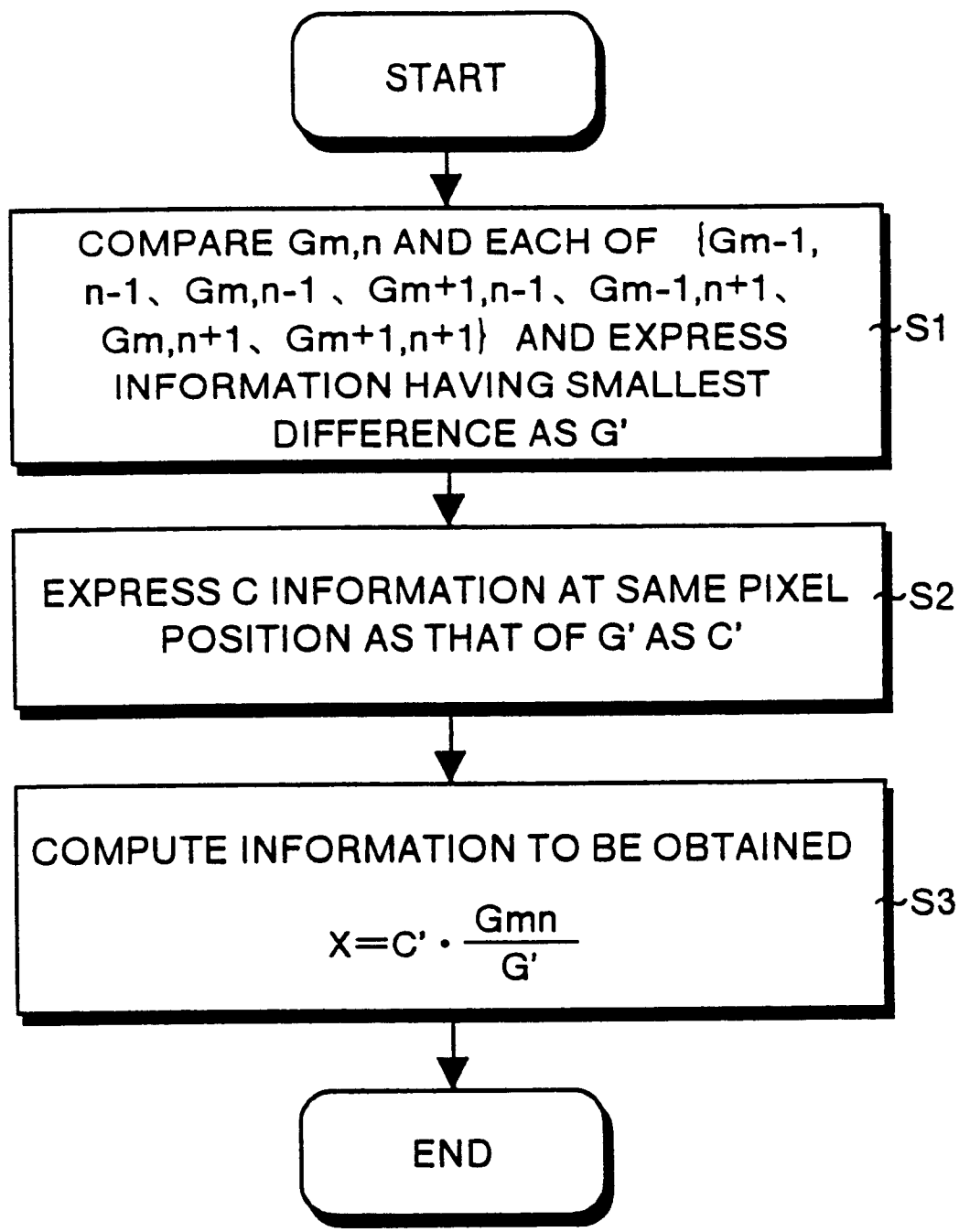
FIG. 16 shows a view for explaining a sequence of computing short color image information for a remarked pixel in Embodiment 2.

FIG. 13 shows a view for explaining color image information for a remarked pixel, FIG. 14 shows a view for explaining patterns in light sections and dark sections, FIG. 15 shows a view for generalizing color image information for a remarked pixel, and FIG. 16 shows a view for explaining a sequence of computing short color image information for a remarked pixel.

It is assumed that color image information for a CCD shown in FIG. 7 comprises, as shown in FIG. 13, for example, (R1, G1), (R2, G2), (R3, G3), (B4, G4), (B5, G5), (B6, G6), (R7, G7), (R8, G8), and (R9, G9). A remarked pixel is set here to (B5, G5). Description is made hereinafter for a method of preparing short color information R5 for this remarked pixel (B5, G5).

In the method in Embodiment 1, to prepare short color information R5 for this remarked pixel (B5, G5), information for pixels (R2, G2) and (R8, G8) adjacent to the remarked pixel (B5, G5) in the vertical direction is used, but in Embodiment 2, color information for a pixel having the highest correlation to G5 among G information (G1, G2, G3, G7, G8, G9) for pixels around the remarked pixel (B5, G5) is used.

For example, when a light and dark pattern as shown in FIG. 14 exists, G5 is a close value to those of G2, G3, G8, and G9. Then, assuming that a value of the highest correlation to G5 is G2, information for short R5 is computed according to $R5 = R2 \cdot (G5/G2)$ obtained by using this information (G2, R2).

Next description is made for a case where the computing method is generalized. The color array in FIG. 13 which has been generalized can be expressed as shown in FIG. 15. In FIG. 15, G information for a remarked pixel is expressed as Gmn, and the other color image information (R or B information) as C. A sequence of computing short color image information for a remarked pixel is shown in the flow chart in FIG. 16.

In FIG. 16, at first, each correlation between the remarked pixel Gm, n and each of {Gm−1, n−1; Gm, n−1; Gm+1, n−1; Gm−1, n+1; Gm, n+1; Gm+1, n+1} is compared, and among {Gm−1, n−1; Gm, n−1; Gm+1, n−1; Gm−1, n+1; Gm, n+1; Gm+1, n+1}, information having the smallest difference from Gm, n, namely information having the highest correlation to Gm, n is expressed as G' (step S1). Then, C information at the same pixel position as that of G' is expressed as C' (step S2). Then, assuming information to be obtained is X, information X to be obtained can be computed according to the expression $X = C' \cdot (Gm, n/G')$ (step S3).

As described above, when short color image information for a remarked pixel is to be acquired in Embodiment 2, short color image information is computed according to color image information for a pixel having the highest correlation to the color image information for the remarked pixel among adjacent pixels around the remarked pixel, so that short color image information can accurately be acquired.

In Embodiment 3, description is made for an array of color pixels for a CCD as well as a direction to which the pixels are displaced for the purpose of accurately acquiring short color image information for a remarked pixel. Description is made hereinafter for a method of acquiring color image information according to Embodiment 3 with reference to FIG. 17 to FIG. 27.

Figures 17, 18:
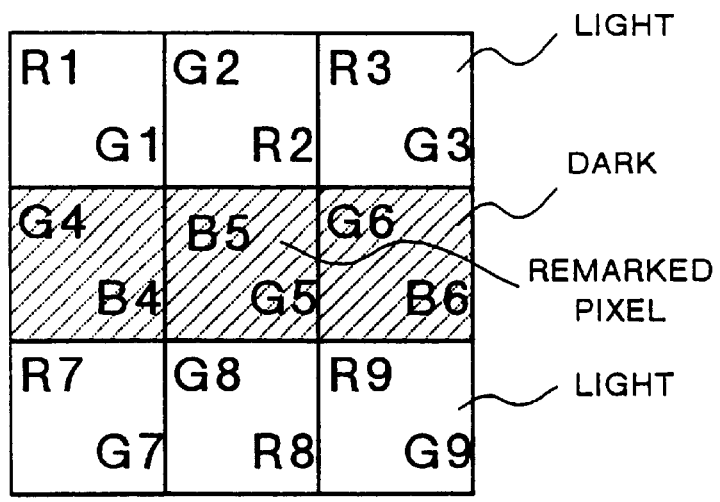
FIG. 17 is a view for explaining a pattern between light sections and dark sections in Embodiment 3.
FIG. 18 is a view showing a color array of light-sensing elements (CCD) in Embodiment 3.
Figures 19, 20:
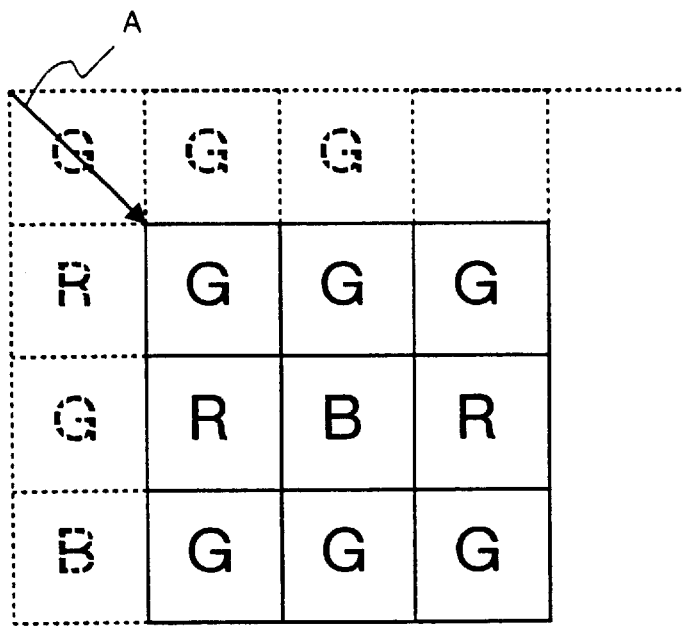
FIG. 19 is a view for explaining a movement direction of the CCD (a direction to which a pixel is displaced) in Embodiment 3.
FIG. 20 is a view for explaining how the light-sensing elements shown in FIG. 18 change according to relative displacement in Embodiment 3.
Figure 21:
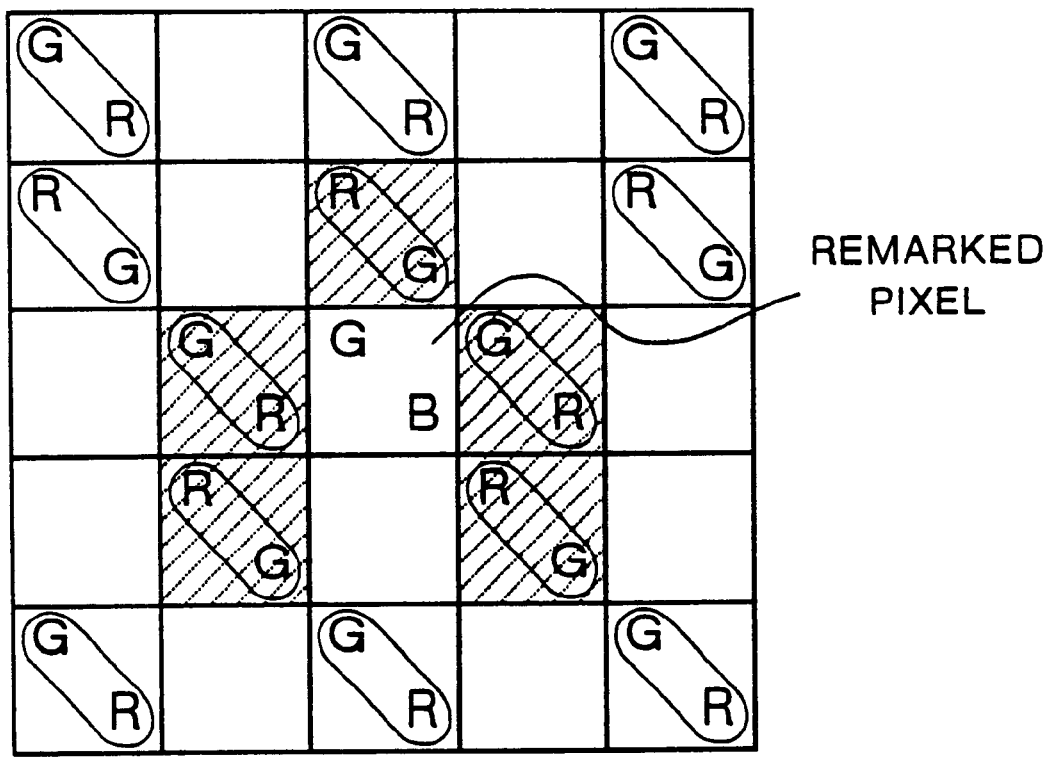
FIG. 21 is a view for explaining how the light-sensing elements shown in FIG. 18 change according to relative displacement in Embodiment 3.
Figure 26:
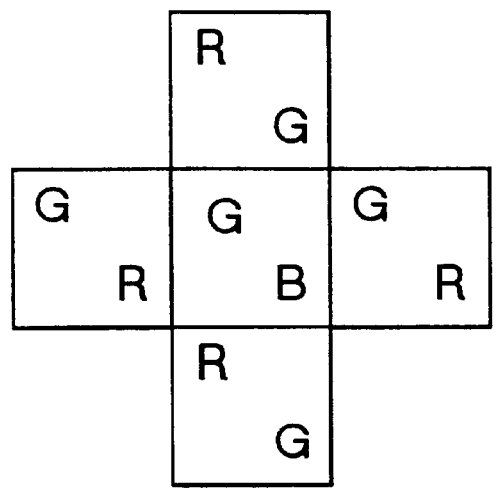
FIG. 26 is a view for explaining how the light-sensing elements shown in FIG. 24 change according to relative displacement in Embodiment 3.
Figure 27:
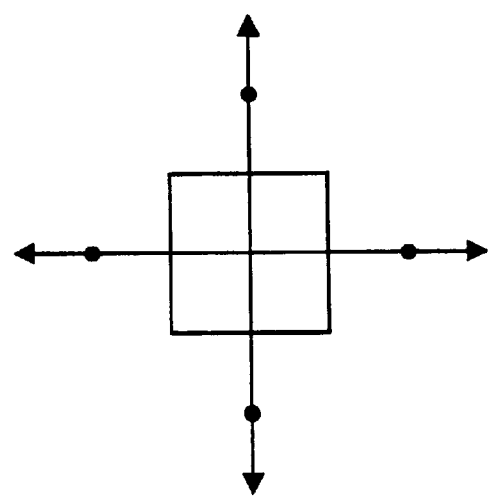
FIG. 27 is a view for explaining how the light-sensing elements shown in FIG. 24 change according to relative displacement in Embodiment 3.

FIG. 17 is a view for explaining a pattern in light sections and dark sections, FIG. 18 is a view showing a color array of light-sensing elements (CCD), FIG. 19 is a view for explaining a movement direction of the CCD (a direction to which a pixel is displaced), FIG. 20 to FIG. 23 are views for explaining how the light-sensing elements shown in FIG. 18 change according to relative displacement, FIG. 24 is a view showing another color array of light-sensing elements, and FIG. 25 to FIG. 27 are views for explaining how the light-sensing elements shown in FIG. 24 change according to relative displacement.

In Embodiment 1, as shown in FIG. 3, R, G, and B are set to an array in a checkered pattern, and by displacing the array by one pixel in the horizontal direction as shown in FIG. 5, the color image information shown in FIG. 7 is obtained. Consideration is made on a case where dark sections exist in this color image information in the horizontal direction as shown in FIG. 17. Assuming that a remarked pixel is (B5, G5) herein, to compute short color image information for R5, color image information for pixels around the remarked pixel (R1, G1), (R2, G2), (P3, G3), (R7, G7), (R8, G8), and (R9, G9) has to be used. In this case, as the dark sections exist in the horizontal direction, there is not much correlation between the remarked pixel (B5, G5) and each of other pixels therearound (R1, G1), (R2, G2), (R3, G3), (R7, G7), (R8, G8), and (R9, G9).

For this reason, colors for pixels of CCD 103A are arrayed like, (G, G, G, G . . . ), (R, B, R, B . . . ), (G, G, G, G . . . ), (B, R, B, R . . . ), . . . as shown in FIG. 18, in which a G array is arranged every other line in a stripe shape, and pixels of R and B are alternately arranged respectively in the other lines. Then, the CCD 103A in which colors are arrayed as shown in FIG. 18 is displaced by one pixel, as shown in FIG. 19, in the relatively diagonal direction to an image of the picked-up object (direction indicated by the arrow A in FIG. 19) by the actuator 103B as a relative position displacing unit, and by synthesizing color information for the pixels before movement and color information for the pixels after movement, the color image information as shown in FIG. 20 can be obtained.

Consideration is made on a case of acquiring short color image information for a remarked pixel according to the color image information as shown in FIG. 20 in the same method as that having been described in Embodiment 2. In FIG. 20, when R information for the remarked pixel (G, B) is to be computed from pixels around the remarked pixel, the shaded pixels in FIG. 21 can be used for interpolation. To be shown further more simply, available pixels around the remarked pixel exist in the directions shown in FIG. 22. Conversely, FIG. 23 shows sections having the same color array as that of the remarked pixel in a simple pattern.

Figure 22:
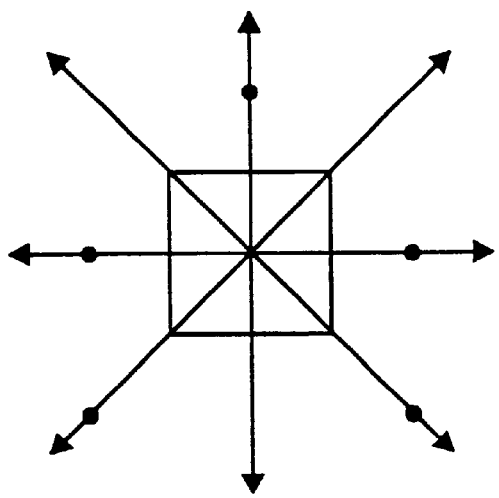
FIG. 22 is a view for explaining how the light-sensing elements shown in FIG. 18 change according to relative displacement in Embodiment 3.
Figure 23:
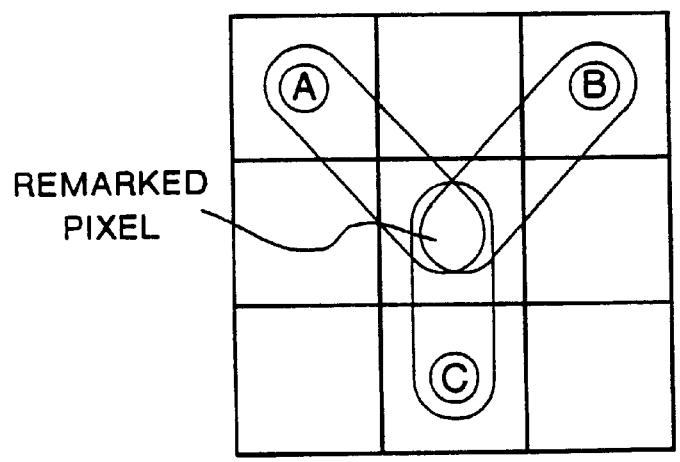
FIG. 23 is a view for explaining how the light-sensing elements shown in FIG. 18 change according to relative displacement in Embodiment 3.

Namely, as shown in FIG. 22, at least one pixel among the pixels around the remarked pixel can be used for interpolation in each of the horizontal, vertical, and diagonal directions against said remarked pixel. With this feature, it is found that a pixel having high correlation exists among pixels around the remarked pixel, for example, even when any of the horizontal, vertical, and diagonal directions against said remarked pixel is a dark section.

Accordingly, even when any of the horizontal, vertical, and diagonal directions against said remarked pixel is a dark section in the color image information as shown in FIG. 20, a peripheral pixel having high correlation to the remarked pixel exists, and for this reason, when short color information is to be prepared according to the same method as that described above, short color information is prepared according to color information for a pixel having higher correlation in the periphery. With this feature, short color information can accurately be obtained.

As described above, in Embodiment 3, a CCD obtained by alternately arranging a G pixel array comprising only G pixels and a RG pixel array with R pixels and G pixels alternately arranged therein is displaced by one pixel in the diagonal direction, so that probability in which any pixel having color image information with high correlation to color image information for the remarked pixel exists around the remarked pixel is increased, and for this reason, in a case of acquiring short color information for a remarked pixel, and when short color information is to be computed according to color image information for a pixel having the highest correlation to the color image information for the remarked pixel among adjacent pixels around the remarked pixel, short color information can more accurately be obtained.

It should be noted that a color array of pixels for the CCD is not limited to the one shown in FIG. 18, so that a color array shown in FIG. 24 may be employed. The example in FIG. 24 comprises (G, G, G, G . . . ), (R, B, R, B . . . ), (G, G, G, G . . . ), (R, B, R, B . . . ), . . . , in which a G array and a repeated array by RB are alternately arranged respectively. The array in FIG. 24 has a different point from that in FIG. 18 in that the repeated pattern by R and B is the same in each lines.

The CCD 103A having the color array as shown in FIG. 24 is displaced by one pixel, as shown in FIG. 19, in the relatively diagonal direction to an image of the picked-up object (direction indicated by the arrow A in FIG. 19) by the actuator 103B, and by synthesizing color information for the pixels before movement and color information for the pixels after movement, the color image information as shown in FIG. 25 is obtained. When short image information for R is to be acquired assuming here that a remarked pixel is (G, B), available pixels are as shown in FIG. 26, and to be shown further more simply, the available pixels around the remarked pixel exist in the directions shown in FIG. 27.

Although the CCD 103A is displaced by the actuator 103B as a relative position displacing unit in Embodiment 1, like in Embodiment 4 described below, an image formed position of an object to be picked up may be displaced by a relative position displacing unit such as a prism by making use of changes of the image of the picked-up object due to unintentional movement of hands in taking a picture.

Figure 28:
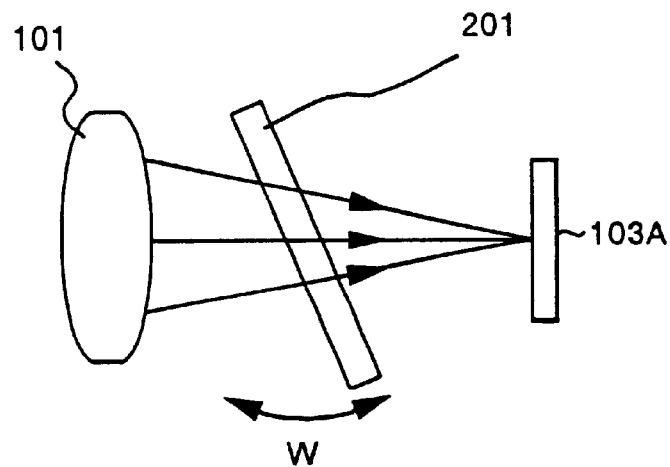
FIG. 28 is a view showing a relative displacing mechanism of an image pickup device according to Embodiment 4.

FIG. 28 is a view showing a relative displacing mechanism of an image pickup device according to Embodiment 4 of the present invention. In Embodiment 4, as shown in FIG. 28, a prism 201 is provided between a lens 101 as an optical system for picking-up and a CCD 103A as an image pickup element. Assuming that the blocks shown in FIG. 1 constitute the entire configuration herein, under the condition of replacing the relative displacing mechanism from the configuration in FIG. 2 to the configuration in FIG. 28, a picking-up range of an object to be picked up is changed if an instruction to rotate in the direction indicated by the arrow W is given from the CPU 121 to the prism 201, so that a relative positional relation between the CCD 103A and the object to be picked up is displaced.

The same effect as that in Embodiment 1 can be obtained in Embodiment 4.

Although many relative positional relations are acquired by driving the actuator or the prism in Embodiments 1 and 4, like Embodiment 5 described below, a relative positional relation may be obtained by copying one image of an object to be picked up to a plurality of sheets thereof. It should be noted that the entire configuration employs the blocks shown in FIG. 1 of Embodiment 1, so that description is made hereinafter only for different points from those in Embodiment 1.

Figure 29:
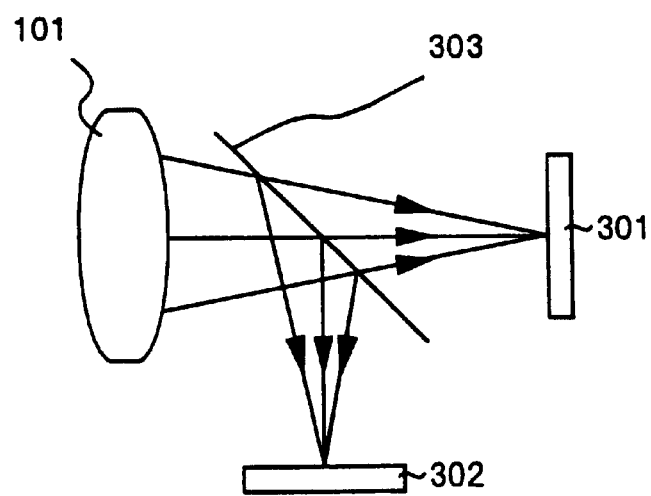
FIG. 29 is a view showing a relative displacing mechanism of an image pickup device according to Embodiment 5.

FIG. 29 is a view showing a relative displacing mechanism of an image pickup device according to Embodiment 5 of the present invention. The image pickup device according to Embodiment 5 is realized, as shown in FIG. 29, by fixing a half mirror 303 for passing therethrough light in a light path of the lens 101, providing a CCD 301 for sensing light having passed through the half mirror 303 in the latter stage thereof, and providing a CCD 302 for sensing reflected light in the lower side (in the figure) from the half mirror 303.

According to the configuration shown in FIG. 29, for incident light through the lens 101 in the half mirror 303, one of the light passes through the half mirror to be sensed by the CCD 301, and the other is reflected and sensed by the CCD 302. For this reason, two sheets of images of the picked-up object each having a different relatively positional relation against the object to be picked up are acquired.

With Embodiment 5, an image of an picked-up object received by the lens 101 as an optical input unit is branched into a plurality of light paths by the half mirror so that the same image of the picked-up object as the original one is sensed by each image pickup element, and for this reason, a blurred image due to unintentional movement of hands in taking a picture does not occur and moving video information can also be acquired, and in addition it is possible to obtain a simple configuration not requiring a complicated optical system such as a dichroic prism for color separation as the three-plate image pickup device.

Next description is made for modifications applicable to each of the embodiments. It should be noted that the modifications described below may be applied to each of the embodiments by one or a combination of two or more.

Figure 30:
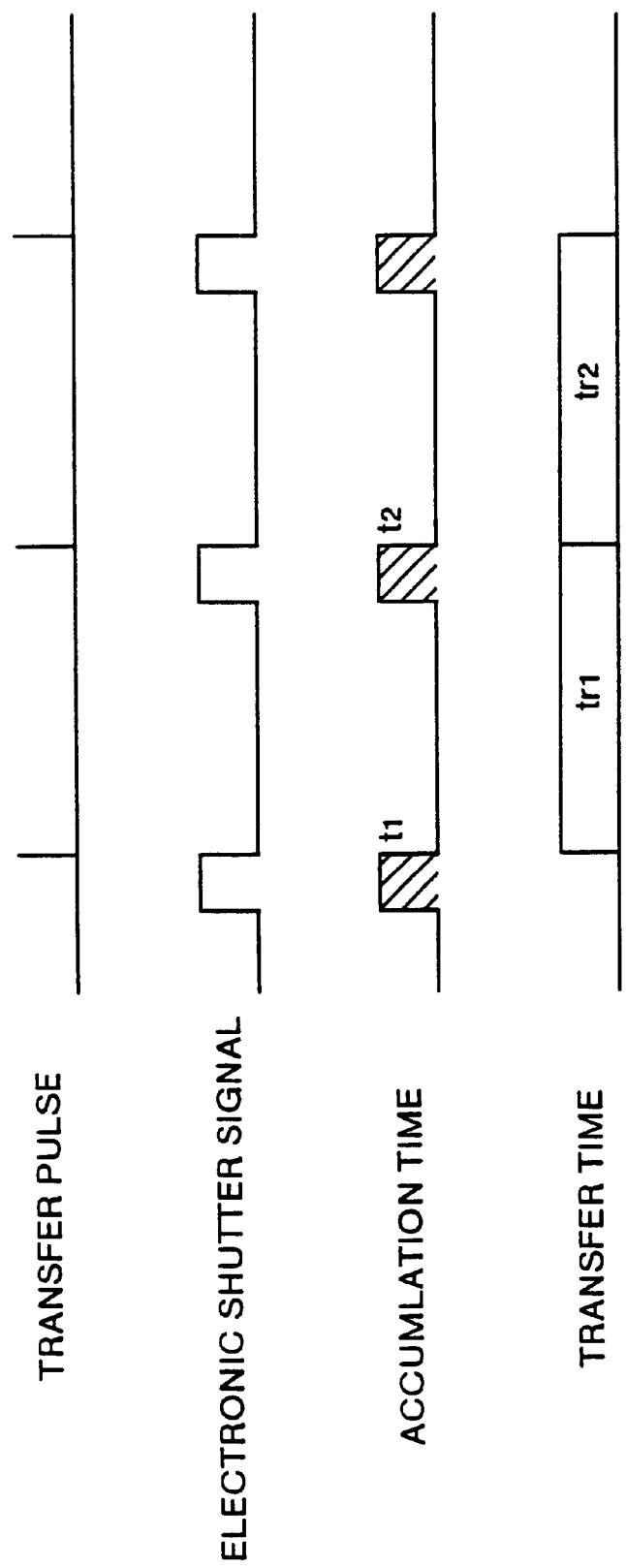
FIG. 30 is a timing chart of a case where an electronic shutter is applied in one modification.

By the way, when an area CCD is used as a solid-state color pickup element, as shown in FIG. 30, an accumulation time (exposure time) is made short even if an electronic shutter is used, but an interval between accumulation times is set to be constant and not made shorter because a transfer time of an image is inputted in each interval. Namely, when the area CCD is operating at a timing of a transfer pulse, an electronic shutter signal, and accumulation times t1, t2 . . . , transfer times tr1, tr2 . . . are always included in each of the accumulation times t1, t2 . . . .

Figure 31:
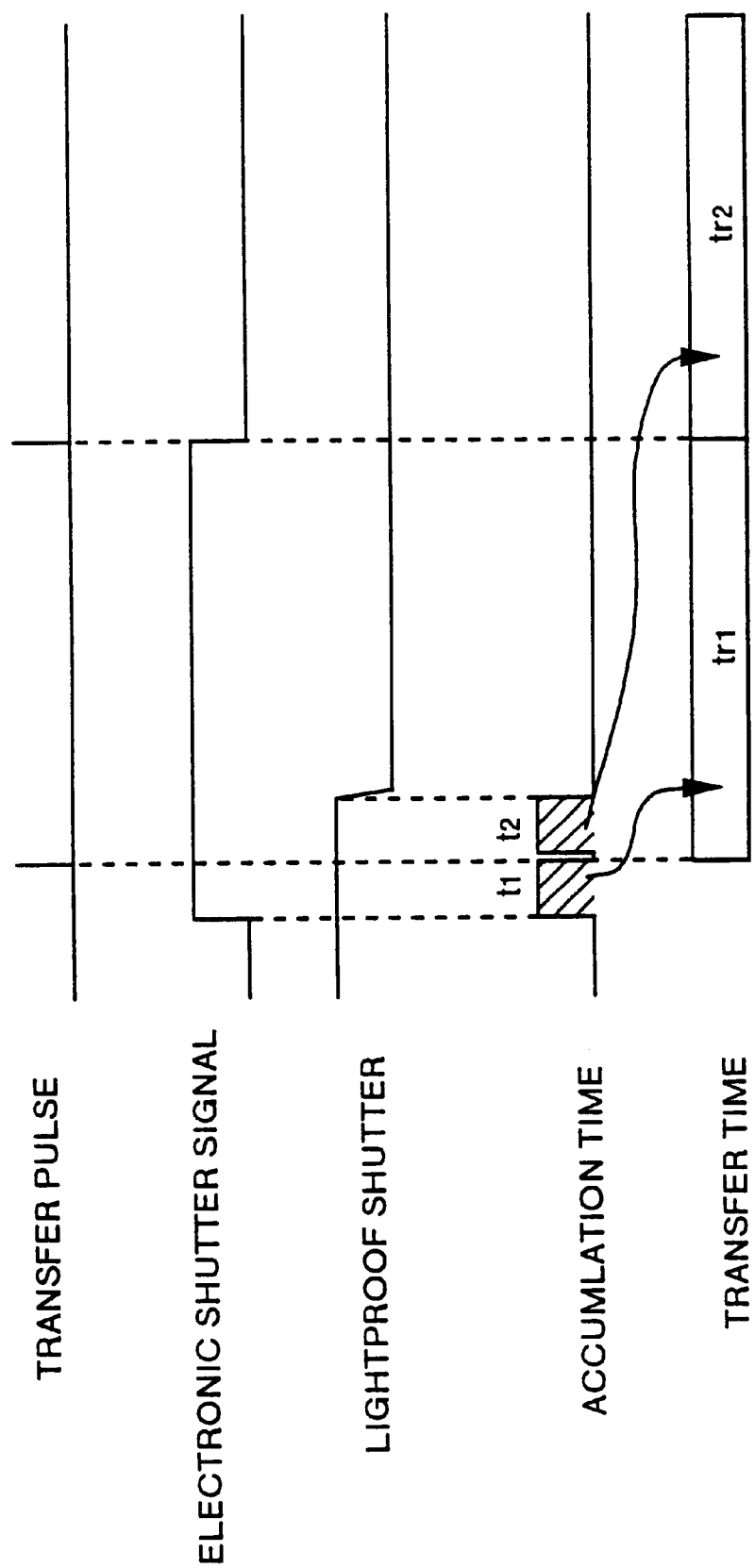
FIG. 31 is a timing chart of a case where an electronic shutter and a lightproof shutter are applied in another modification.

For this reason, as shown in FIG. 31, a lightproof shutter such as a mechanical shutter is provided on the entire surface of the CCD, two accumulation times are provided for the electronic shutter and the lightproof shutter, so that an interval between the two accumulation times may be made shorter. Namely, a first transfer (transfer time tr1) is completed until a first transfer pulse rises after the electronic shutter signal is ON, and the next transfer (transfer time tr2) is finished during the time from the rising of the first transfer pulse till the lightproof shutter operates according to the lightproof shutter signal.

In this case, an effective accumulation time of the exposure time for each color image information is set in correlation to a driving timing between the electronic shutter and the mechanical shutter, and a transfer operation by the image pickup element within each exposure time is completed, so that intervals between accumulation times for acquiring a plurality of color image information can be reduced, and with this feature, it is possible to resolve the problems such as unintentional movement of hands in taking a picture.

Also, there is a possibility that exposure may be nonuniform due to occurrence of changes in external light and variations in accumulation times because exposure is executed twice to obtain a plurality of color image information. As a method of correcting the nonuniformity, color image information for green (G) is obtained through the first exposure and the second exposure, and nonuniformity in the exposure is detected by averaging the entire or partial information, so that it is possible to correct the nonuniformity by multiplying the first or second color image information (G) by a factor for the correction.

In this case, at least a difference in accumulation times for the plurality of color image information is corrected, so that it is possible to acquire a high-quality image even if there is nonuniformity in exposure when a plurality of color image information is acquired.

Although description has been made for a case of obtaining two types of image of picked-up object (color image information) by displacement in the embodiment, effect is not be reduced even if combining the method described above with some other method such as displacement by a half pixel.

Figure 32:
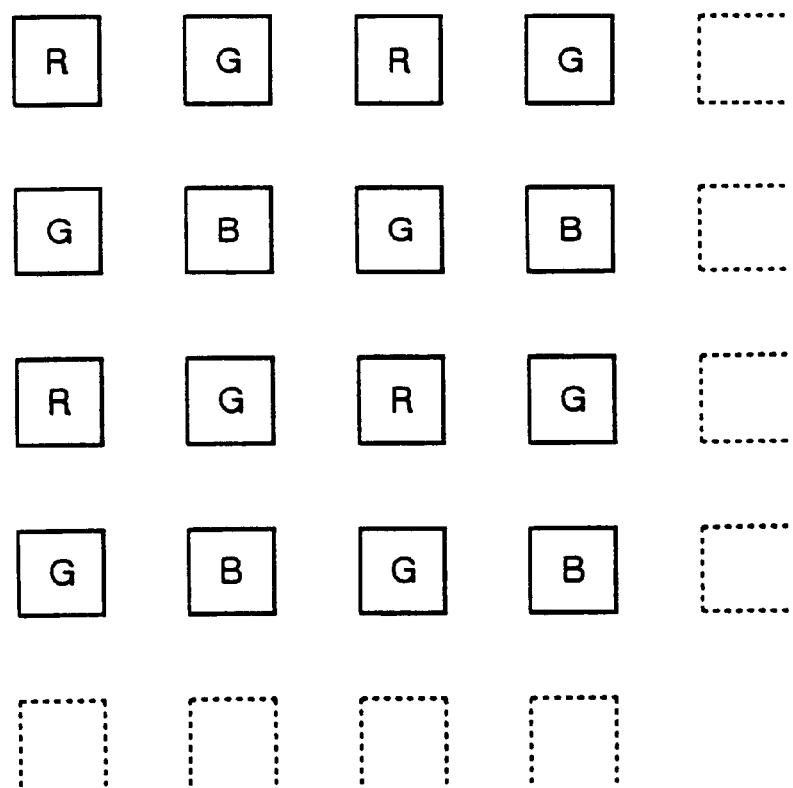
FIG. 32 is a view for explaining an example of which pixels are displaced three times in another modification.
Figure 33:
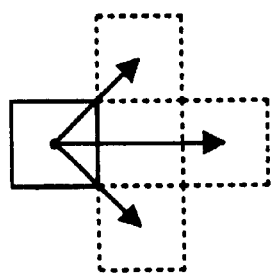
FIG. 33 is a view for explaining an example of which pixels are displaced three times in another modification.
Figure 34:
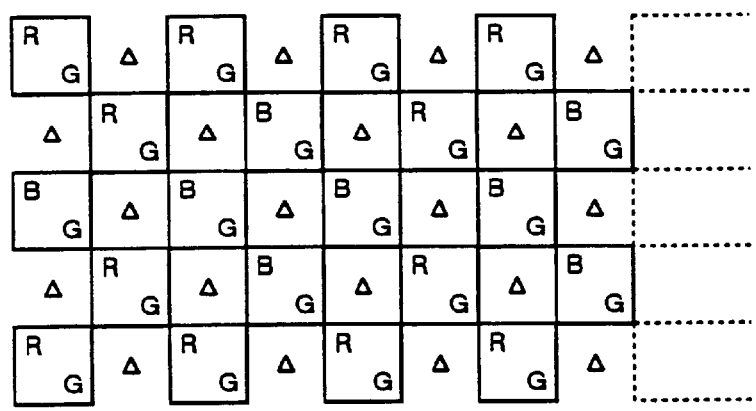
FIG. 34 is a view for explaining an example of which pixels are displaced three times in another modification.
Figure 35:
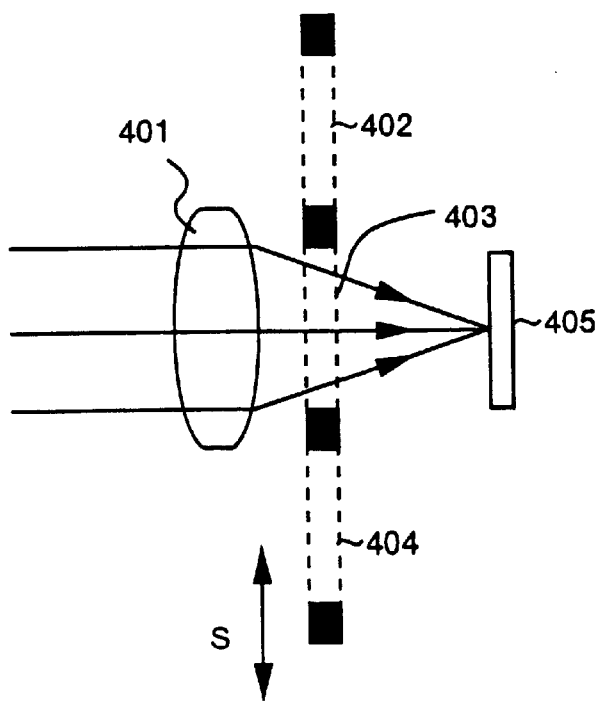
FIG. 35 is a view schematically showing an image pickup device employing the first image pickup system based on the conventional technology.
Figure 36:
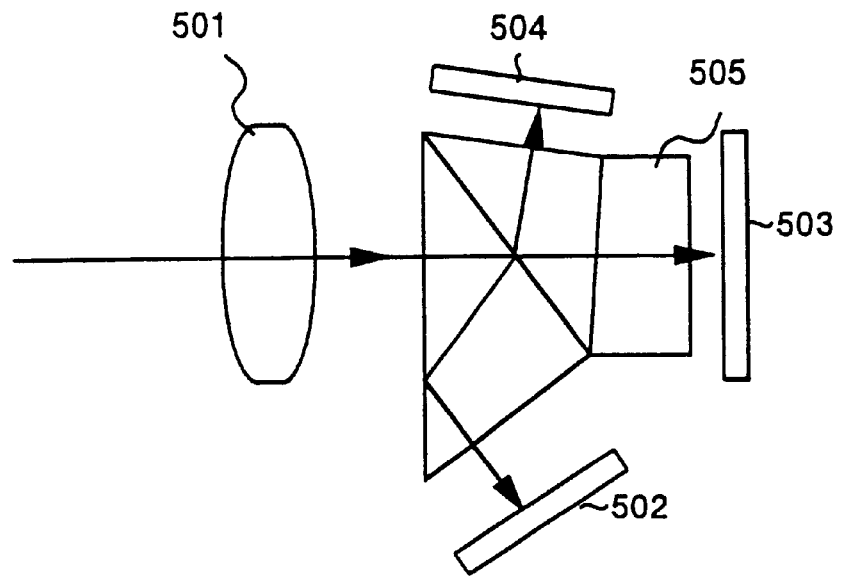
FIG. 36 is a view schematically showing an image pickup device employing the second image pickup system based on the conventional technology.
Figure 37:
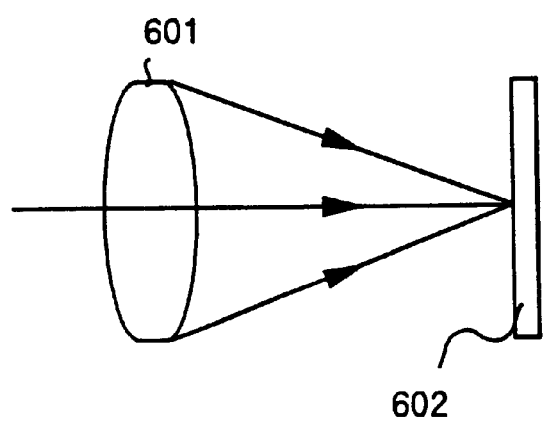
FIG. 37 is a view schematically showing an image pickup device employing the third image pickup system based on the conventional technology.
Figure 38:
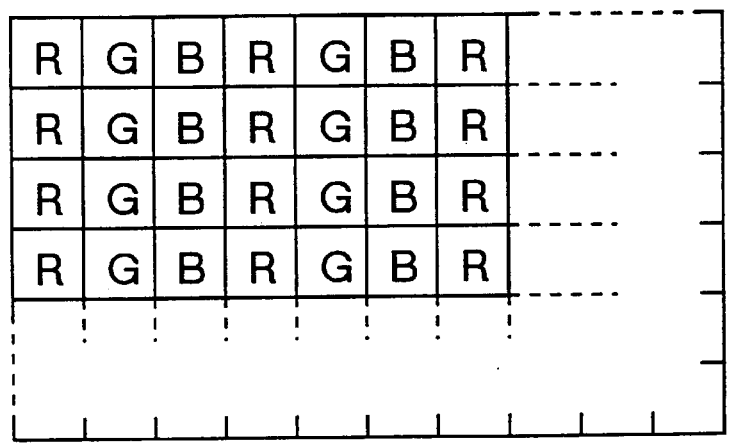
FIG. 38 is a view showing a color array of light-sensing elements based on the conventional technology.
Figure 39:
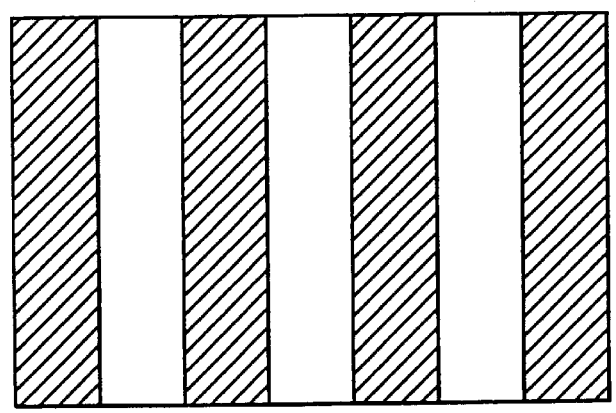
FIG. 39 is a view showing one example of an object to be picked up having light section and dark sections based on the conventional technology.
Figure 40:
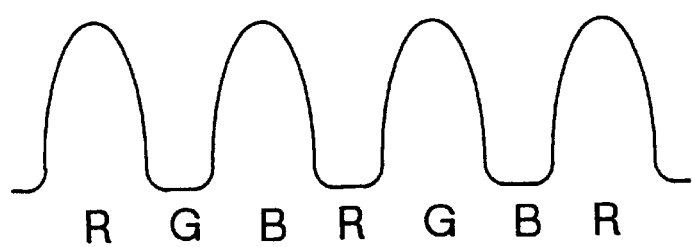
FIG. 40 is a view showing a density level corresponding to each color based on the conventional technology.

The number of times of displacing pixels in pixel displacement is not limited to one time, and a plurality of times may be executed. FIG. 32 to FIG. 34 show an example of that the pixels are displaced three times. For example, when the pixels in the color array shown in FIG. 32 are displaced by two pixels in the horizontal direction, and by one pixel in each of right-upwardly/right-downwardly diagonal directions, the color image information shown in FIG. 34 can be obtained. In FIG. 34, image information for sections indicated by Δ may be computed by interpolation.

In the embodiment, although the description has been made for a case of a digital camera as an example, this invention is not limited to the embodiment, and it is to be understood that any modifications and changes to devices such as a video camera, digital video camera, a color scanner, a color copying machine, and a color facsimile may be possible.

As described above, with the image pickup device according to the present invention, the image pickup unit and the image of the picked-up object inputted by the optical input unit are relatively displaced from each other by the relative position displacing unit, and color image information for a certain color for one screen is obtained according to a plurality sheets of color image information for the same picked-up object obtained by the displacement, and further color image information for one screen is obtained according to the color image information for the certain color for one screen, so that, by making use of the fact that the sensitivity for detecting change in hue is lower than that for detecting change in brightness, which is human visual characteristics, and a change in hue at a high frequency is not sensed as it is but is sensed as gray, it is possible to obtain an image pickup device in which occurrence of a pseudo color or unintentional movement of hands in taking a picture can be prevented with simple configuration.

With the image pickup device according to the present invention, short color image information for a remarked pixel is obtained according to correlation in the certain color, so that short color image information can accurately be computed.

With the image pickup device according to the present invention, color image information for a certain color for the remarked pixel and the color image information for the certain color for other pixels around the remarked pixel are compared to each other, and short color image information for the remarked pixel is obtained according to color image information for a pixel around the remarked pixel having the highest correlation, so that short color image information can accurately be computed.

With the image pickup device according to the present invention, the light-sensing elements are provided so that, when preparing short color image information for a remarked pixel, at least one available pixel exists around the remarked pixel in each of the horizontal, vertical, and diagonal directions against the remarked pixel, so that short color image information can accurately be computed.

With the image pickup device according to the present invention, color image information with a certain color for the remarked pixels is compared to the color image information for a certain color for the available pixels around the remarked pixel, and short color image information for the remarked pixel is obtained according to color image information for one of the available pixels around the remarked pixel with the highest correlation, so that short color image information can more accurately be computed.

With the image pickup device according to the present invention, either one of the object to be picked up and the image pickup unit is displaced, so that displacement occurs in a relative position, and with this feature, it is possible to obtain an image pickup device allowing simple configuration not requiring a plurality of image pickup elements nor a mirror optical system to be obtained.

With the image pickup device according to the present invention, an image of an object to be picked up inputted by the optical input unit is branched to a plurality of light paths to have the same image of the object to be picked up as the image of the object to be picked up received by each of the image pickup elements, so that it is possible to obtain an image pickup device in which information for moving video pictures can be acquired without occurrence of unintentional movement of hands in taking a picture and also simple configuration not requiring a complicated optical system such as dichroic prism for color separation like a three-plate type of image pickup device can be obtained.

With the image pickup device according to the present invention, the filters for three elementary colors of R, G, and B are arrayed so that the elementary color filter for G (Green), which is the certain color, can be positioned for all pixel positions when displaced by the relative position displacing unit, so that the elementary filter of G has wide spectrum sensitivity overlapping both of spectrum sensitivity of R (Red) as well as of B (Blue), and with this feature, it is possible to obtain an image pickup device in which an information amount for an image of an object to be picked up increases by acquiring color image information for G over one entire screen, which enables the color image to be matched to human visual characteristics.

With the image pickup device according to the present invention, an effective accumulation time within the each exposure time for the color image information is set according to a timing for driving the electronic shutter and the mechanical shutter, and a transfer operation by the image pickup unit is finished within the exposure time, so that each interval between accumulation times to obtain a plurality of color image information can be reduced, and with this feature, it is possible to obtain an image pickup device in which the problems such as unintentional movement of hands in taking a picture can be resolved.

With the image pickup device according to the present invention, at least a difference in accumulation times for the plurality of color image information is corrected, so that it is possible to obtain an image pickup device in which a high-quality image can be acquired even if there is nonuniformity in exposure when a plurality of color image information is acquired.

This application is based on Japanese patent applications No. HEI 9-098429 and No. HEI 10-052523 filed in the Japanese Patent Office on Mar. 31, 1997 and Mar. 4, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image pickup device comprising:
   an optical input unit for optically inputting an image of an object to be picked up;
   an image pickup unit, in which a single array of light-sensing elements each having a sensitivity for one of red, blue, and green primary color wavelengths are two-dimensionally arrayed in pixel positions, for obtaining color image information from the image of the picked-up object inputted from said optical input unit;
   a relative position displacing unit connected to said image pickup unit for displacing said image pickup unit and the object relative to one another; and
   a control unit for driving said relative position displacing unit to obtain a plurality of sheets of color image information for the same picked-up object from said image pickup unit by obtaining a first sheet of color information with said image pickup unit at a first position relative to said object to be picked up, displacing said image pickup unit and said object to be picked up relative to one another, obtaining a second sheet of color information with said image pickup unit at a second displaced position relative to said object to be picked up, wherein the first and second sheets of color information do not contain color image information for the same predetermined color for each pixel position, and combining the first and second sheets of color information resulting in the combined first and second sheets containing color image information for the same predetermined color for each pixel position,
   wherein each pixel position contains a short color image information of one of said primary color wavelengths indicating an absence of color information for said one of said primary color wavelengths, and wherein said control unit interpolates said short color information for a predetermined pixel based on color image information from only one adjacent pixel;
   wherein said control unit compares color image information for said predetermined color for said predetermined pixel to said color image information for the predetermined color for a plurality of adjacent pixels to said predetermined pixel, and interpolates the short color image information for said predetermined pixel according to color image information for only one pixel adjacent the predetermined pixel having a highest correlation to said predetermined pixel.

2. An image pickup device according to claim 1, wherein said light-sensing elements are provided so that, when preparing the short color image information for the predetermined pixel, at least one available pixel exists adjacent said predetermined pixel in each of the horizontal, vertical, and diagonal directions relative to said predetermined pixel.

3. An image pickup device according to claim 1, wherein said relative position displacing unit displaces either one of said object to be picked up and said image pickup unit.

4. An image pickup device according to claim 1, wherein said image pickup unit comprises a plurality of image pickup elements, and said relative position displacing unit branches an image of an object to be picked up inputted by said optical input unit to a plurality of light paths to have the same image of said object to be picked up as said image of the object to be picked up received by each of said image pickup elements.

5. An image pickup device according to claim 1, wherein said image pickup unit has filters for three elementary colors of R (Red), G (Green), and B (Blue), and said filters for three elementary colors are arrayed so that the elementary color filter for G(Green), which is said predetermined color, can be positioned for all pixel positions when said image pickup unit is displaced by said relative position displacing unit.

6. An image pickup device according to claim 1, wherein said image pickup unit has an electronic shutter and a mechanical shutter, and sets an effective accumulation time within an exposure time for the color image information according to a timing for driving said electronic shutter and said mechanical shutter, and finishes a transfer operation by said image pickup unit within said exposure time.

7. An image pickup device according to claim 1, wherein said control unit corrects at least a difference in accumulation times for said plurality of color image information.

8. An image pickup device comprising:

an optical input unit for optically inputting an image of an object to be picked up;

an image pickup unit, in which a single array of light-sensing elements each having a sensitivity for one of red, blue, and green primary color wavelengths are two-dimensionally arrayed in pixel positions, for obtaining color image information from the image of the picked-up object inputted from said optical input unit;

a relative position displacing unit connected to said image pickup unit for displacing said image pickup unit and the object relative to one another; and a control unit for driving said relative position displacing unit to obtain a plurality of sheets of color image information for the same picked-up object from said image pickup unit by obtaining a first sheet of color information with said image pickup unit at a first position relative to said object to be picked up, displacing said image pickup unit and said object to be picked up relative to one another, obtaining a second sheet of color information with said image pickup unit at a second displaced position relative to said object to be picked up, wherein the first and second sheets of color information do not contain color image information for the same predetermined color for each pixel position, and combining the first and second sheets of color information resulting in the combined first and second sheets containing color image information for the same predetermined color for each pixel position, wherein each pixel position contains a short color image information of one of said primary color wavelengths indicating an absence of color information for said one of said primary color wavelengths, and wherein said control unit interpolates said short color information for a predetermined pixel based on color image information from the first and second sheets of color information;

wherein said control unit compares color image information for said predetermined color for said predetermined pixel to said color image information for the predetermined color for a plurality of adjacent pixels to said predetermined pixel, and interpolates the short color image information for said predetermined pixel according to color image information for only one pixel adjacent the predetermined pixel having a highest correlation to said predetermined pixel.

* * * * *